United States Patent [19]

Ploss et al.

[11] 4,404,169

[45] Sep. 13, 1983

[54] PROCESS FOR PRODUCING CUPRIC HYDROXIDE

[75] Inventors: Hartmut Ploss; Jürgen Lehne, both of Hamburg, Fed. Rep. of Germany

[73] Assignee: Norddeutsche Affinerie AG, Hamburg, Fed. Rep. of Germany

[21] Appl. No.: 442,749

[22] Filed: Nov. 18, 1982

[30] Foreign Application Priority Data

Nov. 20, 1981 [DE] Fed. Rep. of Germany ....... 3145995

[51] Int. Cl.$^3$ .............................................. C01G 3/02
[52] U.S. Cl. ..................................... 423/35; 423/265; 423/604
[58] Field of Search ................... 423/27, 35, 604, 265; 424/140

[56] References Cited

U.S. PATENT DOCUMENTS

| Re. 24,324 | 5/1957 | Furness | 423/604 |
| 2,666,688 | 1/1954 | Furness | 423/604 |
| 2,924,505 | 2/1960 | Page | 423/306 |
| 3,428,731 | 2/1969 | Furness | 424/140 |
| 3,635,668 | 1/1972 | Barker | 423/604 |
| 4,097,281 | 6/1978 | Swinkels | 423/604 |
| 4,292,281 | 9/1981 | Chilcote | 423/604 |

Primary Examiner—Brian E. Hearn
Attorney, Agent, or Firm—Karl F. Ross; Herbert Dubno

[57] ABSTRACT

In a process of producing cupric hydroxides, products having a high stability in storage will be obtained if phosphate ions are added to a suspension of copper oxychloride in an aqueous phase, the copper oxychloride is then reacted with alkali metal hydroxide or alkaline earth metal hydroxide, and the cupric hydroxide precipitated as a result of the suspension is washed and then re-suspended and subsequently stabilized by the addition of acid phosphate to adjust a pH value of 7.5 to 9. The suspended copper oxychloride is preferably reacted in the presence of phosphate ions in an amount of 1 to 4 grams per liter of the suspension and at a temperature of 20° to 25° C. and the resulting cupric hydroxide is stabilized with phosphate ions in an amount of 3 to 6 grams per liter of the suspension.

13 Claims, No Drawings

PROCESS FOR PRODUCING CUPRIC HYDROXIDE

FIELD OF THE INVENTION

This invention relates to a process for producing cupric hydroxide [Cu(OH)$_2$ or copper (II) hydroxide] by a reaction of copper oxychloride with basic substances.

BACKGROUND OF THE INVENTION

It is known that stable cupric hydroxide cannot be produced directly by a reaction between ordinary water-soluble copper salts, such as cupric sulfate, and sodium hydroxide. The reaction results in a gelatinous precipitate which is gradually transformed into black cupric oxide.

For this reason other methods of producing cupric hydroxide have been adopted, such as the treatment of scrap copper with injected air in a 3% solution of ammonia (U.S. Pat. No. 2,536,096) or the treatment of cupric nitrate solutions with concentrated sodium carbonate solution at 80° C. (German Pat. No. 824,200). But the resulting products lack stability and tend to be transformed to cupric oxide.

In other known processes, cupric sulfate and trisodium phosphate in equimolar quantities are reacted to form copper-sodium phosphate (CuNaPO$_4$) which is then transformed to cupric hydroxide after an addition of an adequate quantity of sodium hydroxide (U.S. Pat. Nos. 2,666,688 and Re 24,324).

The cupric hydroxides produced by the so-called "phosphate process" have the disadvantage that owing to the large number of variable parameters, such as temperature, quantitative proportions, concentration, pH value etc, the resulting cupric hydroxide varies widely in composition and properties. Another disadvantage of that process is that it produces byproduct sodium sulfate in a large quantity of 1 mole per mole of cupric hydroxide creating a disposal problem.

In a different process, in which electrolysis is employed, the solution of a copper salt formed from the copper anode is contacted in the cathode chamber with hydroxyl ions which are present or have been formed there. The electrolytic solution is a solution of sodium sulphate with an addition of sodium phosphate (Open German Application 15 92 441). That process is rather expensive because means for carrying out electrolysis are required.

In processes of a different kind, cupric hydroxide is produced from cupric oxychloride (3 Cu(OH)$_2$·CuCl$_2$·XH$_2$O), in which the copper hydroxide has partly been preformed and which is reacted with basic substances, such as quicklime, at elevated temperatures (German Pat. No. 306,035) and, if desired, under superatmospheric pressure (German Pat. No. 272,182), and optionally with a further dissolution of the cupric hydroxide with ammonia water and renewed precipitation (German Pat. No. 461,556). But the resulting end products also lack adequate stability.

OBJECTS OF THE INVENTION

It is an object of the invention to provide for the production of cupric hydroxide from copper oxychloride a process which can be carried out in a simple manner and is inexpensive and results in a cupric hydroxide which has a high stability on storage.

Another object of our invention is to provide a method of producing copper (II) hydroxide from copper oxychloride whereby disdvantages of the earlier techniques are avoided, i.e. the product has a high degree of stabilityeven with long term storage.

DESCRIPTION OF THE INVENTION

We have discovered, quire surprisingly in view of earlier experiences with the presence of phosphate ion in conjunction with copper as described, that it is possible to utilize phosphate ion as a stabilizer for the reaction of copper oxychloride and an alkali, to thereby obtain copper (II) hydroxide in the form which is highly stable.

According to the invention, therefore, cupric hydroxide i.e. divalent copper hydroxide, is produced from copper oxychloride by adding phosphate ions to a suspension of the copper oxychloride in an aqueous phase and then reacting the copper oxychloride in the presence of these phosphate ions with the alkali, namely, an alkali metal hydroxide and/or an alkali earth metal hydroxide to precipitate out the cupric or copper (II) hydroxide. According to this invention, moreover, the precipitated cupric hydroxide is recovered from the supernatant, is washed, is again suspended in an aqueous phase and is stabilized by the addition to the latter of acid phosphate.

The cupric hydroxide is once again separated from the suspending medium and washed and can be used directly, e.g. by suspending it in water or some other medium or can be dried to produce a powder. Both the alkali suspension and the powder are capable of long term storage.

Another advantage of this system is that the various filtrates, supernatants and aqueous systems from which the precipitate is removed can be utilized as the aqueous phase for the initial reaction i.e. to suspend the copper oxychloride for production of additional quantities of cupric hydroxide, thereby minimizing the discharge of even trace amounts of the copper.

In accordance with the invention, therefore, phosphate ions are added to a suspension of the copper oxychloride in an aqueous phase before the latter is reacted with alkali metal hydroxide and/or alkaline earth metal hydroxide and the cupric hydroxide which has been precipitated as a result of the reaction is washed and is again suspended and then stabilized by an addition of acid phosphate to adjust a pH value of 7.5 to 9.

The process according to the invention differs from the known "phosphate processes" in that there is no reaction to form, e.g. copper-sodium phosphate, in spite of the fact that phosphate ions are added, because the added phosphate ions act only as a stabilizer. For this reason it is sufficient, in a further development of the invention, to react the suspended copper oxychloride in the presence of phosphate ions in a quantity of at least 0.5 gram, and preferably of 1 to 4 grams, per liter of the suspension and/or to stablize the resulting cupric hydroxide with phosphate ions in a quantity of at least 1 gram, preferably 3 to 6 grams, per liter of the suspension.

Phosphoric acid may suitably be used as an acid phosphate for adjusting to a pH value of 7.5 to 9 but a primary phosphate, such as primary sodium phosphate, may also be used.

Copper oxychloride is preferably reacted in a suspension of relatively high density because in that case the process solution which has been separated from the resulting cupric hydroxide and the spent washing water which becomes available in subsequent steps can be used entirely or in a large part in a new starting solution. An excessively high density of the suspension must be avoided because this would result in an inadequate mixing.

In a preferred embodiment of the invention, copper oxychloride to be reacted is contained in the suspension in an amount of up to 25% by weight, preferably 10 to 15% by weight.

This will result in optimum conditions regarding the quantity of process solution or process water which becomes available and the possibility to thoroughly mix the reactants.

In another desirable embodiment of the invention, copper oxychloride is reacted at a temperature of up to 35° C., preferably 20° to 25° C. This will avoid a transformation of parts of the cupric hydroxide to oxide.

Copper oxychloride is preferably reacted with sodium hydroxide solution. To ensure a quantitative reaction, a stoichiometric surplus is required. An even higher surplus will accelerate the process. For instance, the reaction will be completed in up to 20 minutes if sodium hydroxide solution is added in four times the quantity which is required for the reaction.

A particularly suitable source of copper oxychloride is a freshly prepared and washed suspension in which copper oxychloride has been formed in situ.

The cupric hydroxide obtained by the process according to the invention contains 55 to 62% by weight copper and has a particle size of 0.1 to 5 microns and does not change in physical and chemical composition even over several years. It may be subjected to further processing in the form of a suspension or a wet filter cake or a dry powder.

The cupric hydroxide produced by the process according to the invention is particularly suitable for use in the production of other copper compounds and of copper pigments and in the formulation of preparations for the protection of plants.

The invention will be explained more in detail and by way of example in the following Example.

EXAMPLE 230 liters of a suspension in which copper oxychloride has been formed in situ and which contains 570 grams solids per liter were mixed with 7.5% of 20% by weight phosphoric acid in 250 liters water with stirring. 60 kg caustic soda, which had been dissolved in 250 liters water, were subsequently admixed rapidly while a reaction temperature of 22° C. was maintained. This resulted in a suspension of high viscosity. The reaction was completed within a few minutes and the process solution was then removed.

The cupric hydroxide thus obtained was then washed twice and was subsequently suspended in water. The suspension was adjusted to a pH value of 8 by an addition of about 11 kg 20% by weight phosphoric acid.

The resulting cupric hydroxide was separated from the suspending medium and was washed. It was suitable for further processing in the form of a suspension or of a dried powder.

A large part of the process waters which became available in the process can be used in a new starting mixture for producing cupric hydroxide.

We claim:

1. A process for producing cupric hydroxide which comprises the steps of:
    (a) forming an aqueous suspension of copper oxychloride;
    (b) adding to said suspension a stabilizing amount of phosphate ions;
    (c) reacting said copper oxychloride in said suspension with an alkali metal hydroxide and/or an alkaline earth metal hydroxide in the presence of said phosphate ions to precipitate cupric hydroxide;
    (d) washing the precipitate formed in step (c);
    (e) suspending the precipitate washed in step (d) in an aqueous phase; and
    (f) stabilizing the precipitate suspended in step (e) by adding thereto an acid phosphate to bring the pH to a value of 7.5 to 9.

2. The process defined in claim 1 wherein the phosphate ions present in said suspension during the reactions in step (c) corresponds to at least 0.5 grams per liter of the suspension therein.

3. The process defined in claim 2 wherein the quantity of phosphate ions is substantially 1 to 4 grams per liter of the suspension in step (c).

4. The process defined in claim 3 wherein the cupric hydroxide is stabilized in step (f) by at least 1 gram of phosphate ions contributed by the acid phosphate per liter of the suspension in step (f).

5. The process defined in claim 4 wherein the copper oxychloride makes up substantially 10 to 15% by weight of the suspension in step (c).

6. The process defined in claim 3 wherein the copper oxychloride makes up substantially 10 to 15% by weight of the suspension in step (c).

7. The process defined in claim 6 wherein the reaction with the copper oxychloride is carried out in step (c) at a temperature up to 35° C.

8. The process defined in claim 7 wherein said temperature is 20° to 25° C.

9. The process defined in claim 4 wherein the reaction in step (c) is carried out at a temperature of 20° to 25° C.

10. The process defined in claim 1 wherein the cupric hydroxide is stabilized in step (f) by at least 1 gram of phosphate ions contributed by the acid phosphate per liter of the suspension in step (f).

11. The process defined in claim 10 wherein the amount of acid phosphate added in step (b) corresponds to 3 to 6 grams of phosphate ions per liter of the suspension.

12. The process defined in claim 1 wherein the copper oxychloride makes up to 25% by weight of the suspension in step (c).

13. The process defined in claim 12 wherein the copper oxychloride makes up substantially 10 to 15% by weight of the suspension in step (c).

* * * * *